(12) United States Patent
Vidal et al.

(10) Patent No.: US 9,274,306 B2
(45) Date of Patent: Mar. 1, 2016

(54) METHOD FOR MANUFACTURING A REFLECTOR, PREFERABLY FOR THE SOLAR ENERGY FIELD

(75) Inventors: Frédéric Vidal, Charvieu (FR); Raphaël Couturier, Sassenage (FR)

(73) Assignee: COMMISSARIAT A L'ENERGIE ATOMIQUE ET AUX ENERGIES ALTERNATIVES, Paris (FR)

( * ) Notice: Subject to any disclaimer, the term of this patent is extended or adjusted under 35 U.S.C. 154(b) by 265 days.

(21) Appl. No.: 13/984,614

(22) PCT Filed: Feb. 13, 2012

(86) PCT No.: PCT/EP2012/052371
§ 371 (c)(1),
(2), (4) Date: Aug. 9, 2013

(87) PCT Pub. No.: WO2012/110438
PCT Pub. Date: Aug. 23, 2012

(65) Prior Publication Data
US 2013/0314813 A1 Nov. 28, 2013

(30) Foreign Application Priority Data
Feb. 14, 2011 (FR) .................................... 11 51178

(51) Int. Cl.
*G02B 5/10* (2006.01)
*G02B 7/183* (2006.01)
(Continued)

(52) U.S. Cl.
CPC ............... *G02B 7/183* (2013.01); *F24J 2/1057* (2013.01); *G02B 7/182* (2013.01); *G02B 27/62* (2013.01); *F24J 2002/108* (2013.01); *Y02E 10/40* (2013.01); *Y10T 29/49826* (2015.01)

(58) Field of Classification Search
CPC ..... F24J 2/0007; F24J 2/0015; F24J 2200/00; F24J 2/38; F24J 2/04; B21D 26/031; H01L 31/058; H01L 31/052; G02B 5/08; G02B 7/183; G02B 27/62; G02B 7/182
USPC .......... 359/553, 871–873, 846–848, 851, 852
See application file for complete search history.

(56) References Cited

U.S. PATENT DOCUMENTS 4,154,222 A 5/1979 Yu
4,266,531 A 5/1981 Behrendt
(Continued)

FOREIGN PATENT DOCUMENTS

DE 3306800 A1 8/1984
DE 3731669 A1 4/1989
(Continued)

OTHER PUBLICATIONS

French Preliminary Search Report issued Feb. 14, 2001 in Patent Application No. 1054658 with English translation of categories of cited documents.
(Continued)

*Primary Examiner* — Euncha Cherry
(74) *Attorney, Agent, or Firm* — Pearne & Gordon LLP

(57) ABSTRACT

The invention relates to a method of manufacturing a reflector (6) including a mirror (16) supported by a support structure (18), where the said method includes a step of positioning the mirror relative to the said support structure by moving a mold (30) supporting the mirror relative to the said structure, According to the invention, the method also includes a step of adjustment of multiple links (20) between the mirror and the structure, implemented during the step of positioning of the mirror, and/or after this step, and causing at least a proportion of the links to be moved relative to the structure (18).

15 Claims, 9 Drawing Sheets

(51) Int. Cl.
    *G02B 27/62*      (2006.01)
    *F24J 2/10*      (2006.01)
    *G02B 7/182*      (2006.01)

(56) References Cited

U.S. PATENT DOCUMENTS

| | | | |
|---|---|---|---|
| 4,583,519 | A | 4/1986 | Gronert |
| 5,411,617 | A | 5/1995 | La Fiandra |
| 6,003,508 | A | 12/1999 | Hoffschmidt et al. |
| 7,810,940 | B2 * | 10/2010 | Schramek et al. ............ 359/881 |
| 2004/0035111 | A1 | 2/2004 | Ven |
| 2007/0264170 | A1 | 11/2007 | Barthe |
| 2008/0011290 | A1 | 1/2008 | Goldman |
| 2009/0056698 | A1 | 3/2009 | Johnson et al. |
| 2009/0056703 | A1 | 3/2009 | Mills |
| 2009/0084374 | A1 | 4/2009 | Mills |
| 2009/0245017 | A1 | 10/2009 | Paul |
| 2009/0260753 | A1 | 10/2009 | Selig et al. |
| 2009/0296245 | A1 | 12/2009 | Schramek et al. |
| 2010/0143215 | A1 | 6/2010 | Caze |
| 2011/0186043 | A1 | 8/2011 | Diaz |
| 2013/0125873 | A1 | 5/2013 | Pra |

FOREIGN PATENT DOCUMENTS

| | | | |
|---|---|---|---|
| DE | 19744541 | A1 | 4/1999 |
| DE | 10248064 | A1 | 4/2004 |
| EP | 1767886 | A2 | 3/2007 |
| EP | 1854536 | A1 | 11/2007 |
| EP | 1947401 | A1 | 7/2008 |
| EP | 2112441 | A2 | 10/2009 |
| JP | 2005195196 | A | 7/2005 |
| WO | 01/61254 | A1 | 8/2001 |
| WO | 2004/023048 | A1 | 3/2004 |
| WO | 2005/063368 | A2 | 7/2005 |
| WO | 2008/21390 | A1 | 10/2008 |
| WO | 2009121174 | A1 | 10/2009 |
| WO | 2010/011689 | A2 | 1/2010 |

OTHER PUBLICATIONS

International Search Report issued Aug. 2, 2011 in PCT/EP2011/059725.

French Preliminary Search Report issued Oct. 4, 2010 in French Patent Application No. 1050132 filed Jan. 11, 2010.

Hao Chen, et al., "Topological mixing on a microfluidic chip", Applied Physics Letters, vol. 84, No. 12, Mar. 22, 2004 pp. 2193-2195.

B.L. Gray, et al., "Novel interconnection technologies for integrated microfludic systems", Sensors and Actuators 77, 1999, pp. 57-65.

Z. Anxionnaz, et al., "Heat exchanger/reactors (HEX reactors): Concepts, technologies: State of the art", Chemical Engineering and Processing: Process Intensification, 47, 2008, pp. 2029-2050.

B.L. Gray, et al., "Interlocking mechanical and fluidic interconnections for microfluidic circuit boards", Sensors and Actuators A, 112, 2004, pp. 18-24.

Xiuqing Li, et al., "Alloy 617 for the High Temperature Diffusion-Bonded Compact Heat Exchangers", Proceedings of ICAPP'08, Paper 8008, Jun. 8-12, 2008 pp. 282-288.

Terry Mazanec, "Intensified Steam Methane Reforming in Microchannel Reactors", Velcys, 231st ACS National Meeting, Sep. 2006, pp. 1-28.

Terry Mazanec, "Catalytic Selective Oxidations in Microchannel Reactors", Velcys, ACS Meeting, Sep. 2006 pp. 1-44.

International Search Report issued Jun. 8, 2011, in International Application No. PCT/EP2011/050215.

L. Luo, et al "Constructal approach and multi-scale components", Applied Thermal Engineering, vol. 27, No. 10, XP022004450, Mar. 29, 2007, pp. 1708-1714.

Preliminary Search Report issued Feb. 14, 2011, in French Patent Application No. 1054067 with English translation of categories of cited document.

International Search Report issued Jul. 28, 2011 in PCT/EP2011/058568.

Daniel G. Di Canio et al., "Line Focus Solar Thermal Central Receiver Research Study", DOE ET 20426-1 Apr. 1979, 298 pages.

International Search report issued Nov. 24, 2011 in PCT/EP2011/059719.

French Preliminary Search Report issued Feb. 25, 2011 in Patent Application No. 1054660 with English Translation of categories of cited document.

International Search Report for PCT/EP2012/052371 dated Apr. 17, 2012.

* cited by examiner

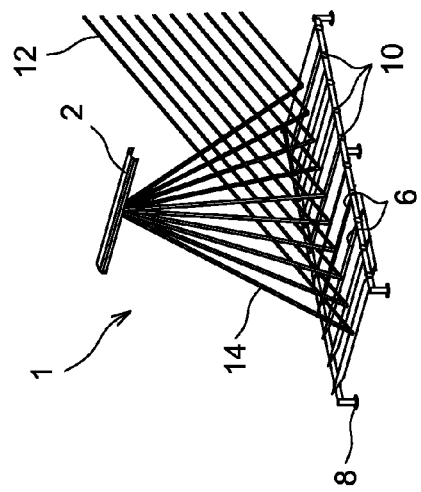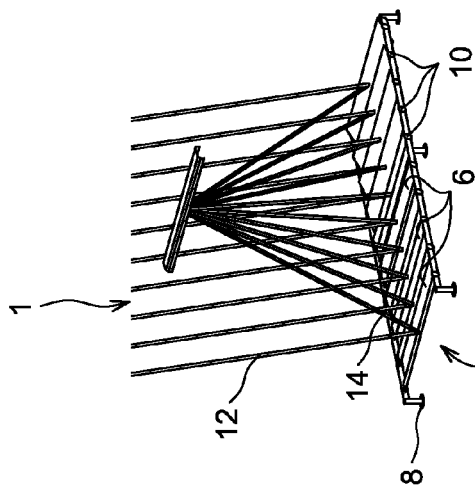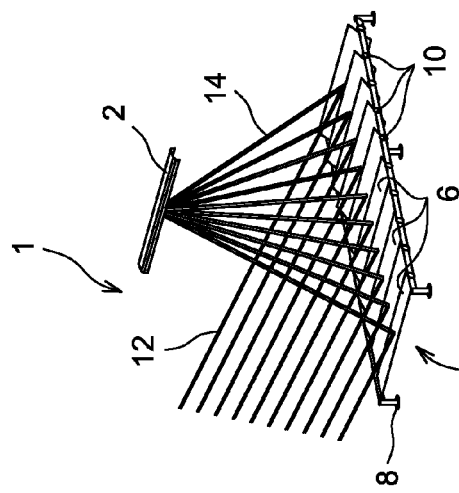

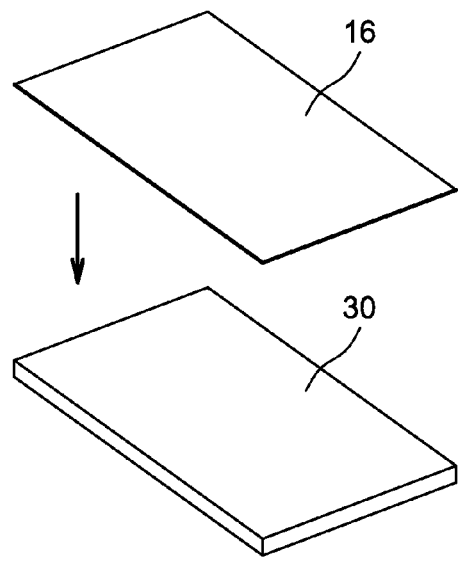
FIG. 6A
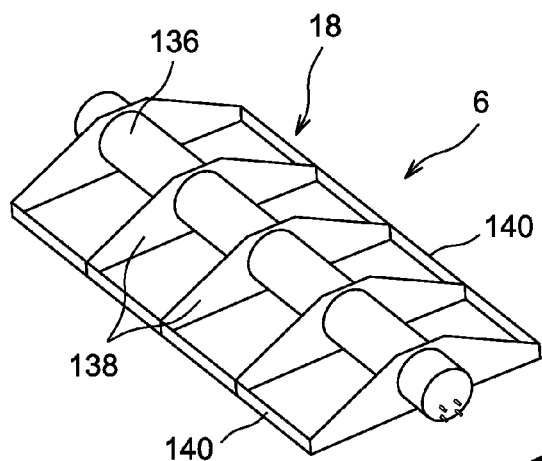
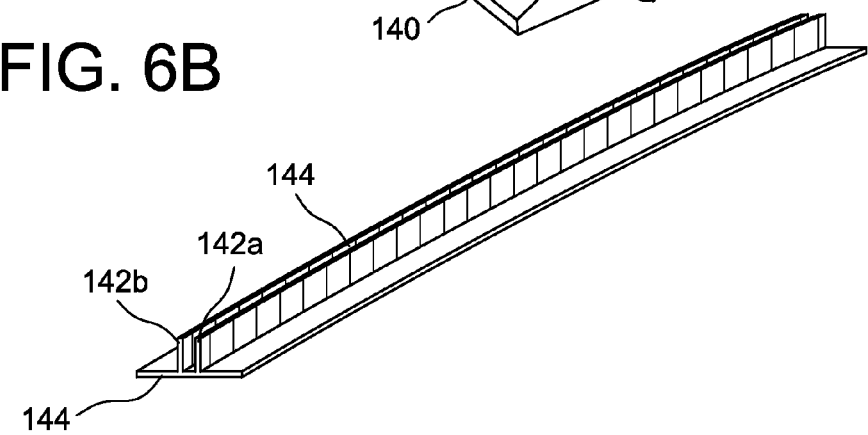
FIG. 6B

METHOD FOR MANUFACTURING A REFLECTOR, PREFERABLY FOR THE SOLAR ENERGY FIELD

TECHNICAL FIELD

The present invention relates to the field of manufacture of specular reflectors to reflect and direct light.

It relates in particular to the manufacturer of reflectors the mirror support structure of which is intended to be mobile, in order that it may direct the light received at different angles. Such reflectors, whether or not they have a mobile support structure, may be used to produce fields of reflectors, for example of the Fresnel type.

The invention applies in particular to the field of solar energy, in particular for the production of systems including a solar collector, and also a field of reflectors concentrating solar radiation on to the collector.

STATE OF THE PRIOR ART

When manufacturing a reflector including a mirror supported by a support structure, a mould is habitually provided on which the mirror is temporarily assembled, where the mould gives this mirror its final shape. A step of positioning of the mirror relative to the rear structure is then accomplished, by moving the mould supporting the mirror relative to this same rear structure.

It may be arranged such that the mirror is pressing directly against the support structure at the end of the abovementioned step. Nevertheless, this requires very small manufacturing tolerances for the support structure, which has a non-negligible impact on the manufacturing cost.

Another solution consists in proceeding such that, at the end of the abovementioned step, the mirror is located apart from the rear structure, where both these elements adopt their relative final positions. In this configuration, blocks of adhesive previously installed on the support structure or on the mirror, and then heated, are deformed during this step of installation of the mirror, whilst being tightened between this mirror and its support structure, as they are moved relative to one another. After the deformed blocks of adhesive are dried they provide the mechanical connection between the mirror and its support structure.

This solution, which is notably described in document US 20090260753A1, enables higher manufacturing tolerances to be adopted for the support structure, although specific flat surfaces must be provided on this structure to support the plastic blocks of adhesive.

In addition, the higher the manufacturing tolerances the more the blocks of adhesive must be of substantial volume to compensate for the manufacturing flaws. However, the use of blocks of adhesive of substantial volume leads to problems in respect of the mirror's ability to be held on its structure, and is not therefore recommended. In particular, in places where the adhesive is too bulky, its lack of rigidity may create a local deformation of the mirror, which is necessarily accompanied by a deterioration of the optical properties provided by it.

Finally, the heating required to soften the blocs of adhesive constitutes an additional constraint in the manufacturing method, in addition to which it is also likely to generate residual shape defects, due to shrinkages which may be seen during cooling. In addition, the mirror may be disassembled only by reheating the deformed blocks of adhesive, which also increases the complexity of this disassembly operation.

DESCRIPTION OF THE INVENTION

The purpose of the invention is therefore to provide at least partially a solution to the disadvantages mentioned above, compared with the embodiments of the prior art.

To accomplish this, a first object of the invention is a method of manufacturing a reflector including a mirror supported by a support structure, where the said method includes a method of positioning the mirror relative to the said support structure by relative movement of a mould supporting the mirror, relative to the said support structure.

According to the invention, the method also includes a step of adjustment of multiple links between the mirror and the support structure, in a position of secure attachment in which they are intended to be securely attached to the mirror and to the support structure, where this step of adjustment, accomplished during the said step of positioning of the mirror and/or after this step, leads to a movement of at least a proportion of, and preferably all, the links relative to the said support structure. The links are preferably metallic, or again made of ceramic or a polymer material. In the remainder of the description, without this being restrictive, the links will be considered to be metallic. Whatever the material used they have sufficient rigidity that they are not deformed during the said adjustment step.

The solution according to the present invention enables very high manufacturing tolerances to be adopted for the support structure, without this being detrimental for the maintenance of the mirror's shape. Indeed, the metal links, whatever their shape, may be moved with high amplitudes during the adjustment step and/or after it, without this having any effect on the rigidity with which the mirror is held after the method is implemented. This therefore contrasts with the known solutions of the prior art, in which only blocks of adhesive are interposed between the mirror and the support structure.

The method according to the invention consequently improves the mirror's mechanical holding properties on its structure, leading to an improvement of the optical properties conferred by the mirror.

It also means that there is no longer any requirement for flat surfaces to be provided specifically on the structure to support the plastic blocks of adhesive.

Finally, due to the fact that large-dimension blocks of adhesive are not present, no heating is required, although such heating may be used, depending on the means of secure attachment between the metal links and the mirror, and the support structure.

A first possible implementation of the method consists in proceeding such that the said step of adjustment, leading to the movement of at least a proportion of the metal links relative to the said support structure, is accomplished at least partially automatically during the said step of positioning of the mirror, after the metal links concerned are pressed against the said mirror.

It is therefore indeed the action of pressing against the mirror and the continuation of the relative movement between the latter and the rear support structure which lead the links to be moved relative to this structure. The automatic character of the movement is naturally advantageous, in that it simplifies the implementation of the method. Nevertheless, this movement may be continued after the step of positioning of the mirror, for example in order to improve the pressing of the links against the mirror, and/or, if applicable, to remove the surplus adhesive from the links to which adhesive has previously been applied.

A second possible implementation of the method consists in proceeding such that the said step of adjustment, leading to the movement of at least a proportion of the metal links relative to the said support structure, is accomplished exclusively after the said step of positioning of the mirror. This step is then accomplished manually or in automated fashion, depending on the design chosen for the links.

Furthermore, it is noted that the said metal links are preferentially intended to be bonded on to the mirror, for example using a standard adhesive, whether or not requiring heating for its application. Another possibility lies in the use of a double-sided adhesive tape, which is simple to use.

In addition, the said metal links are preferentially intended to be securely attached to the support structure by bonding and/or screwing and/or welding and/or riveting.

The said metal links are intended, preferably, to be securely attached by bonding on to the mirror and/or on to the support structure, and the said metal links have adhesive applied before implementing the adjustment step. Naturally, an alternative is possible, in which the bonding is accomplished after the step of adjustment, i.e. after the links have reached their secure attachment positions.

According to a first preferred embodiment of the invention, the said metal links are lengthened elements, for example pin gauges, housed such that they slide in corresponding apertures of the support structure, where the said lengthened elements are inserted into the corresponding apertures before they are pressed against the mirror.

These elements are preferably inserted into their apertures after the step of positioning of the mirror, by sliding them into the said apertures, which sliding movement then stops when the lengthened links press against the mirror. As an alternative, the lengthened elements may already be housed in their apertures before the step of positioning of the mirror is accomplished, being held in these apertures by appropriate means, for example by groove/pin connections holding them at their end positions. One possibility consists in holding them through the effect of viscosity due to the adhesive. In these cases the sliding of the lengthened elements in their apertures is preferably accomplished automatically during the final step of adjustment, after the links come into contact with the mirror, as described above.

In this first preferred embodiment it is preferentially provided that after the step of adjustment the said lengthened metal links are held pressed against the mirror by gravity, in their secure attachment positions. These elements are then securely attached to the mirror and to the support structure by implementation of a specific step, or possibly by allowing a simple drying time when the links have previously had adhesive applied.

According to a second preferred embodiment, the said metal links are profiles with an essentially T-shaped section, the base of each of which is doubled so as to reveal between the two bases a space penetrated by a sliding portion of the support structure, which slides into this space during the said step of positioning of the mirror.

In this case it is the action of pressing against the mirror and the continuation of the relative movement between the latter and the rear support structure which lead the links to be slid relative to this structure. The automatic character of the movement is naturally advantageous, in that it simplifies the implementation of the method. Nevertheless, this sliding movement may be continued after the step of positioning of the mirror, for example in order to improve the pressing of the links against the mirror, and/or, if applicable, to remove the surplus adhesive from the links to which adhesive has previously been applied.

Alternatively, this sliding movement may be accomplished exclusively after the step of positioning of the mirror, without going beyond the scope of the invention. A mixed solution is also conceivable, with a proportion of the profiles moved during and possibly after the step of positioning of the mirror, and other profiles moved only after this step.

Finally, another alternative may consist in installing the profiles on the mirror before implementing the step of positioning of the mirror, during which step the sliding movement is accomplished automatically with the associated portions of the support structure.

However, each profile is preferably installed on the support structure before implementing the said step of positioning of the mirror, by clamping the said sliding portion of the corresponding support structure, between the two bases of the profile.

According to a third preferred embodiment, the said metal links are tabs with a supporting head on the mirror, and a body connected to the support structure by a slide connection formed by a groove traversed by at least two screws and, during the said step of adjustment, at least a proportion of the metal links move automatically relative to the said support structure by moving the screws in the groove, after pressing the supporting heads against the said mirror.

In this case also it is the action of pressing against the mirror and the continuation of the relative movement between the latter and the rear support structure which lead the links to move relative to this structure, due to the movement of the screws in the groove. The automatic character of the movement is naturally advantageous, in that it simplifies the implementation of the method. Nevertheless, this sliding may be continued after the step of positioning of the mirror, for example in order to improve the pressing of the links against the mirror, and/or, if applicable, to remove the surplus adhesive from the links to which adhesive has previously been applied.

In this embodiment, the groove in which screws slide may be made either on the support structure, or on the links.

In this third preferred embodiment, after the said step of adjustment of the metal links, the latter, positioned in their secure attachment position, are securely attached to the support structure by screwing in the said screws, this screwing being accomplished automatically or manually.

This embodiment is particularly advantageous in that it enables the support structure to be reused easily when the mirror must be changed.

Whatever the envisaged embodiment, the said mirror is preferably not planar, and is made from glass, aluminium or polymer. These characteristics are naturally mutually independent. Concerning the shape of the mirror, it may for example be of the panel type, with a single curvature or a double curvature. For information only, single-curvature panels are said to be "developable", and have a rectilinear generatrix, implying that they may be "unrolled" into a plane. Conversely, double-curvature panels are not "developable", and do not therefore have a rectilinear generatrix, i.e. they may not be "unrolled" into a plane. Indeed, they have a first curvature, for example in the lengthways direction of the panel, and also a second curvature, separate from the first, for example in the transverse direction of this same panel.

Another object of the invention is a field of reflectors, where each is manufactured according to the method defined above. This field is, for example, of the Fresnel type, with the reflectors positioned side-by-side, and each support structure installed pivoting on a frame.

A final object of the invention is a system including a solar collector together with such a field of reflectors concentrating the solar radiation on to the collector.

Other advantages and characteristics of the invention will appear in the non-restrictive detailed disclosure below.

BRIEF DESCRIPTION OF THE ILLUSTRATIONS

This description will be made with reference to the attached illustrations, among which:

FIGS. 1a to 1c represent perspective views of a system according to a preferred embodiment of the invention, including a solar collector together with a field of reflectors of the Fresnel type;

FIGS. 6a to 6d represent perspective views representing schematically different steps of the manufacturing method according to the second preferred embodiment;

DETAILED DESCRIPTION OF PARTICULAR EMBODIMENTS

Figure 2A:
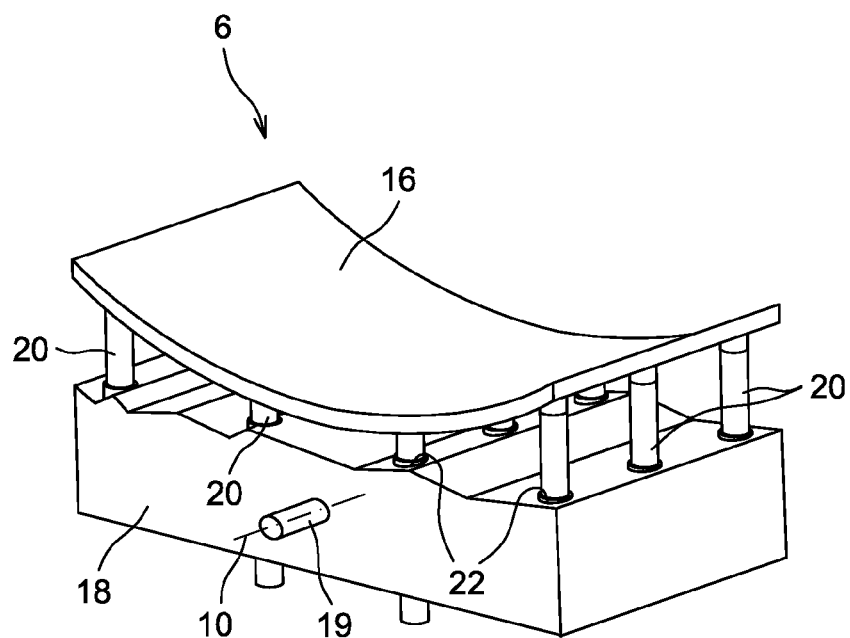
FIGS. 2a and 2b are perspective views seen from two separate viewing angles, of a reflector intended to be obtained according to a first preferred embodiment of the manufacturing method according to the invention.

With reference firstly to FIGS. 1a to 1c, a system 1 may be seen including a solar collector 2 together with a field of reflectors 4 concentrating the solar radiation on the collector. Field 4, for example of the Fresnel type, includes a row of reflectors 6 positioned side-by-side. As will be described in detail below, each reflector 6 includes a mirror assembled on a support structure, where the latter is installed pivoting on a frame 8. Axes of rotation 10 of the reflectors are preferentially parallel. Rotational control of them may be independent or dependent, and controlled so as to concentrate the solar radiation on collector 2 in an optimal manner. With this regard, FIGS. 1a to 1c show three separate configurations in which incident light rays 12 have different alignments, and where each configuration is associated with a particular rotational adjustment of all the reflectors of field 4, enabling reflected rays 14 to be aligned on to collector 2 in an optimal manner.

This is preferably a collector known as a "high-flux" collector, for various applications, for example heating of a heat transfer fluid of the water, oil or fused salt type, or again for the concentrated photovoltaics field. Its power is between several tens of $kW/m^2$ and several $MW/m^2$. Each reflector 6, which is essentially rectangular in shape, has an area of several square meters. The accuracy generally required for this type of system is of the order of 0.1° in respect of the angular adjustment of the reflectors.

Figure 2B:
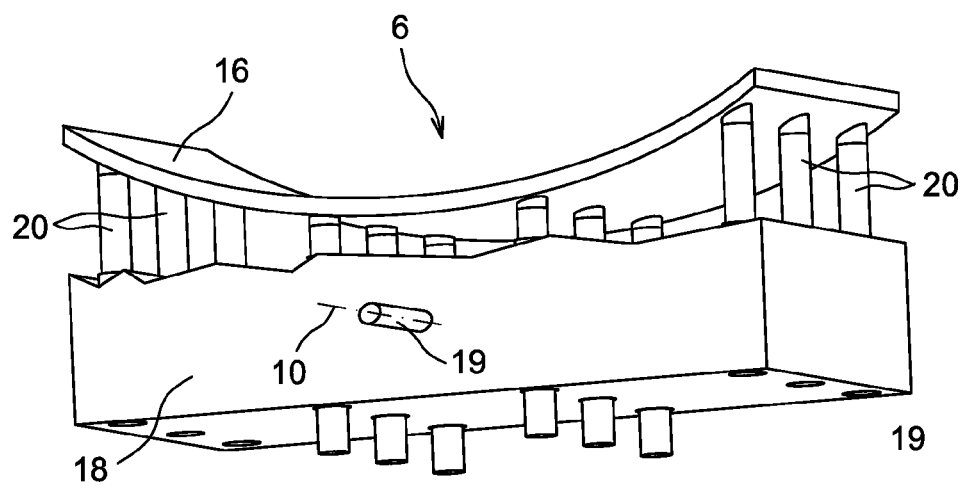
Figure 3A:
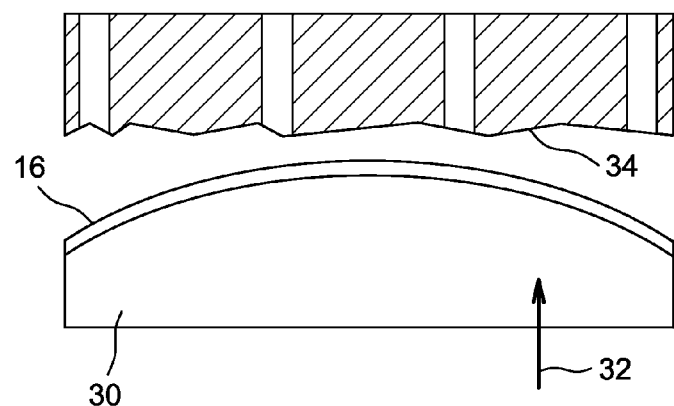
FIGS. 3a to 3c represent front views representing schematically different steps of the manufacturing method according to the first preferred embodiment.
Figure 3B:
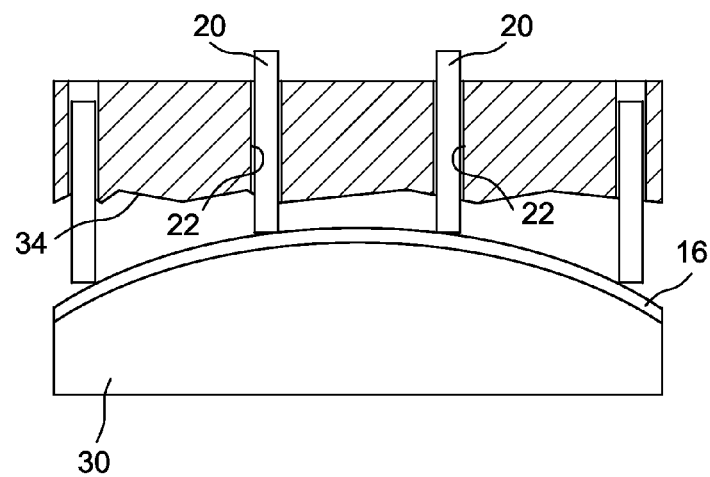
Figure 3C:
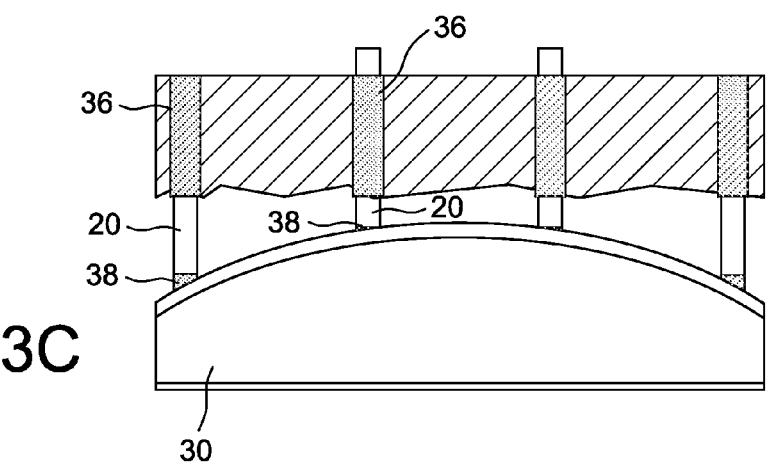
Figure 4A:
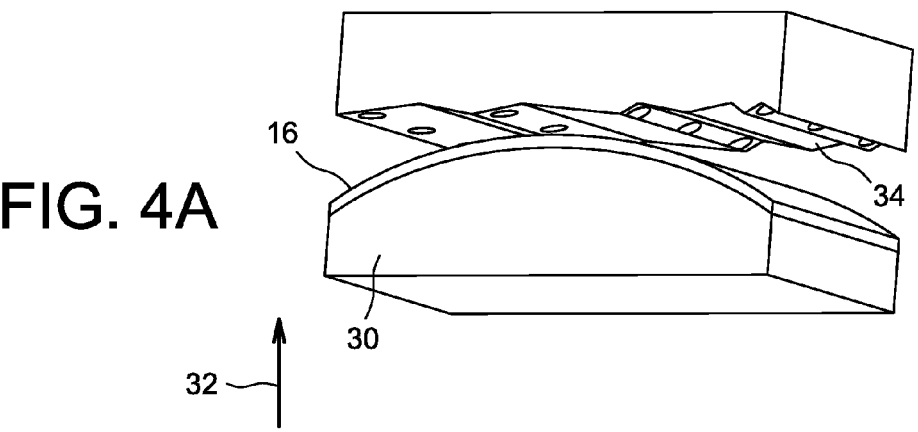
FIGS. 4a to 4c represent perspective views of those shown in FIGS. 3a to 3c, respectively.
Figure 4B:
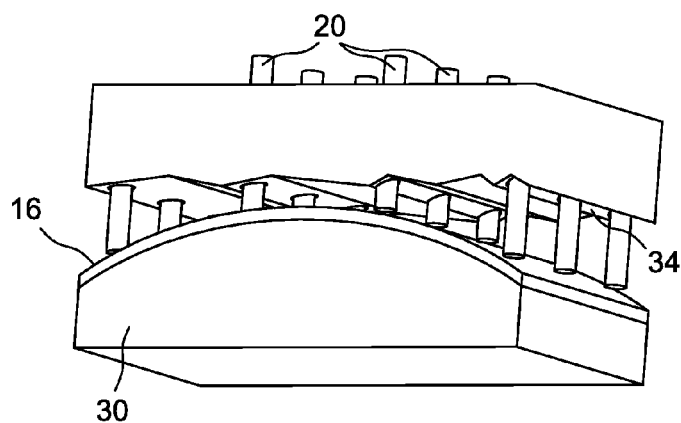
Figure 4C:
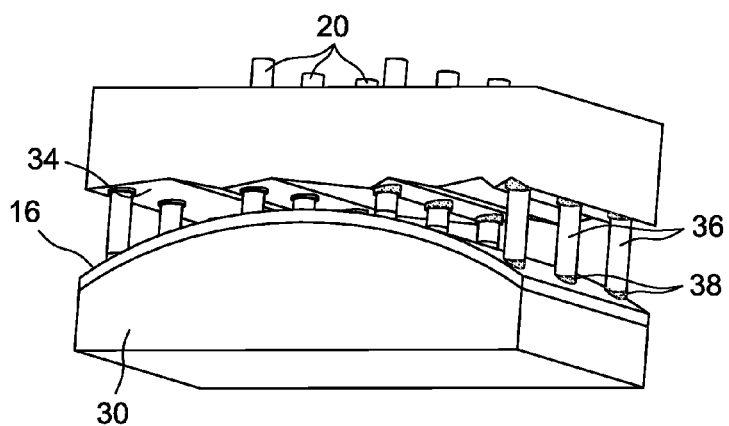

With reference, at present, to FIGS. 2a and 2b, a reflector 6 may be seen of the same type as those used in system 1 of the previous figures, and intended to be obtained according to a first preferred embodiment of the manufacturing method according to the invention.

Reflector 6 firstly includes a mirror 16, of a non-planar shape, made of glass and of the order of 4 mm thick, and typically between 0.1 and 7 mm thick. In this case its shape is single-curvature. However, other shapes may be envisaged, without going beyond the scope of the invention.

It also includes a support structure 18, for example of roughly parallelepipedic shape, whether solid or hollow. It may be made of steel, with large manufacturing tolerances. It has means enabling the reflector to be rotated around shaft 10, in this case rotation pins 19.

The mechanical connection between support structure 18 and mirror 16 is not made over the entire inner surface of the latter, but with the assistance of several links 20 interposed between the mirror and the structure, and securely attached to both. These elements, which are rigid, are preferably metallic, but could alternatively be made of ceramic or of a polymer material. The secure attachment in this case is preferentially accomplished by bonding, although other conventional means may be used, without going beyond the scope of the invention. Clearly, if an adhesive made of polymer material and links made of polymer material are used, the two polymer materials used are different.

These elements 20 are lengthened, for example pin gauges or bars, housed in corresponding apertures 22 which go all the way through support structure 18. In the position of FIGS. 2a and 2b, the upper end of pin gauges 20 is bonded to the inner face of the mirror, whereas the portion of the side area housed in structure 18 is bonded to the portion of the side area facing corresponding aperture 22.

Pin gauges 20 are made, for example, of an aluminium-based alloy, whereas the adhesive used may be of the single-component polyurethane paste-like adhesive type, for example adhesive sold by the company 3M with the reference "Polyurethane Adhesive Sealant 560". Another example is the adhesive sold by the company Hutchinson/ljf with the reference "PR1440". The viscosity of the chosen adhesive is preferentially sufficiently great that the adhesive remains in the connection between the links and the mirror and/or the rear structure.

More specifically, the adhesive is chosen, from among those adhesives having, after drying, a Young's modulus of between 2 and 60 MPa, and a hardness of between 20 and 60 shore A.

Alternatively, to bond the end of pin gauges 20 to the mirror a double-sided adhesive tape may be used.

Due to the rigidity conferred by pin gauges 20, the mirror, the shape of which is maintained due to the latter, has very satisfactory optical properties. Clearly, the more intrinsically flexible is the mirror, the greater the number of links which must be provided.

To manufacture it, as represented schematically with reference to FIGS. 3a to 4c, a step of installation of mirror 16 relative to support structure 18, which is not fitted with pin gauges 20, is firstly implemented.

To accomplish this the mirror is firstly shaped in a mould 30, and then securely attached to this mould in a temporary manner, for example using a conventional adhesive, or by vacuum suction. It is therefore mould 30 which temporarily gives mirror 16 its definitive shape.

A step of positioning of mirror 16 relative to rear structure 18 is then accomplished, by moving the assembly consisting of mould 30 holding the mirror relative to structure 18. In tangible terms, the support structure is placed such that it is stationary in a known frame of reference, in which the mould/mirror assembly is moved vertically upwards towards this structure, as has been represented schematically by arrow 32 in FIGS. 3a and 4a. At the end of this step of positioning of mirror 16 the latter is positioned opposite and apart from structure 18, and no contact is preferentially seen at this stage between these two elements, which are in their final relative positions.

A step of adjustment of pin gauges 20 is then accomplished. To do so, as has been represented schematically in FIGS. 3b and 4b, these pin gauges 20 are inserted from the top into their respective apertures 22, and then slide downwards under gravity into these same apertures, before being stopped when they press against the inner surface of mirror 16. The slide trajectory is not of course the same for each pin gauge 22, and this trajectory depends on the distance between the mirror and surface 34 opposite rear structure 18. It should also be noted that this surface 34 may be produced with large tolerances, without this being detrimental to the maintenance of the mirror's shape, since the latter is supported directly by the pin gauges, and not by this surface 34 from which these pin gauges protrude.

In this first preferred embodiment, at the end of the adjustment step in which pin gauges 20 take up their positions of secure attachment corresponding to their definitive position relative to the mirror and to the support structure, these pin gauges are held in place by gravity pressed against the mirror. These pin gauges 20 are then bonded to the mirror and to support structure 18, as represented schematically in FIGS. 3c and 4c, in which grey-hatched portions 36, 38 are adhesive. If these pin gauges have previously had adhesive applied before they are inserted into apertures 22 of structure 18, a simple drying time need merely be allowed before this adhesive hardens.

Figure 5A:
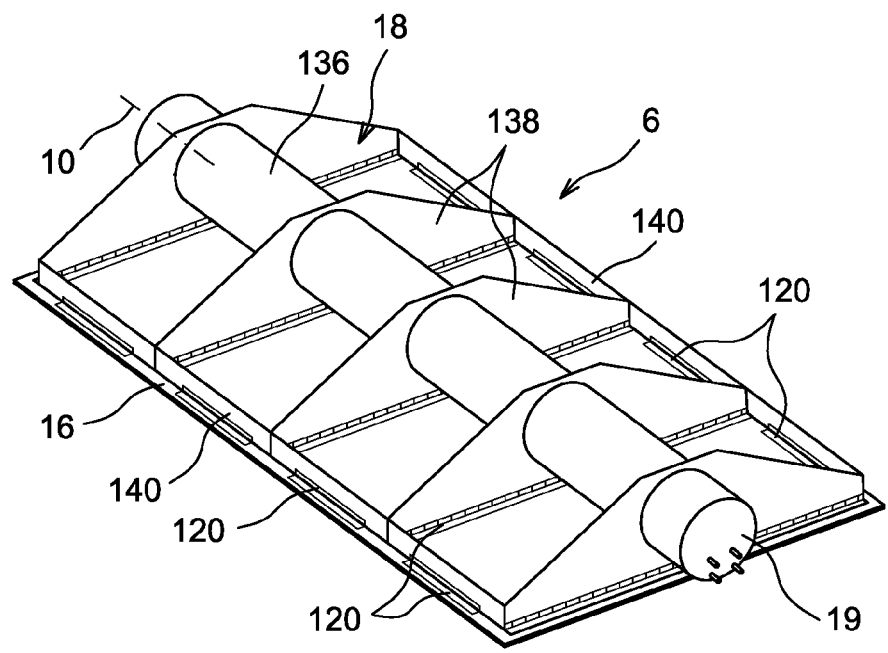
FIGS. 5a and 5b are perspective views seen from two separate viewing angles, of a reflector intended to be obtained according to a second preferred embodiment of the manufacturing method according to the invention.
Figure 5B:
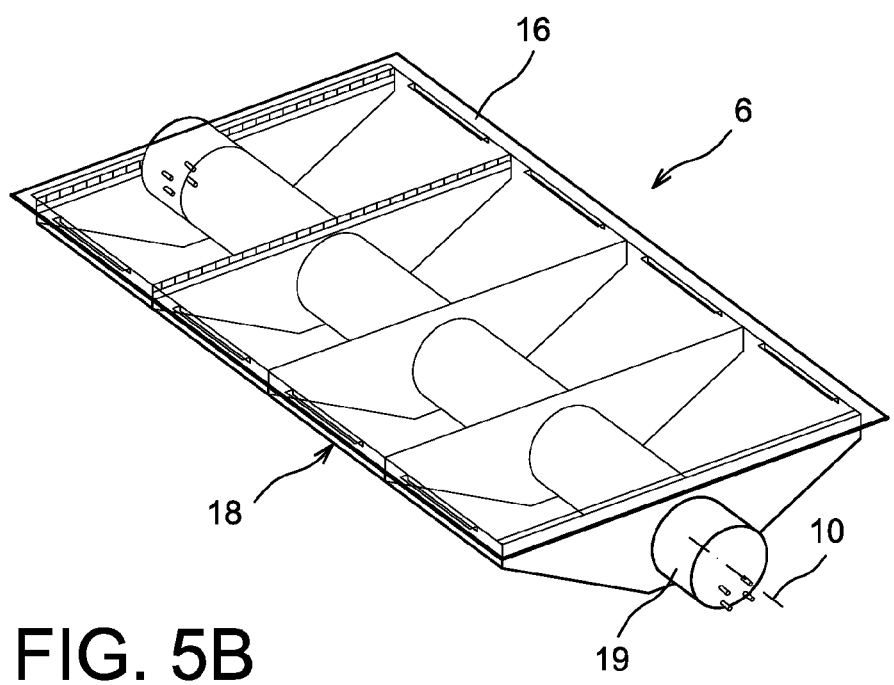

With reference, at present, to FIGS. 5a and 5b, another reflector 6 may be seen of the same type as those used in system 1 of FIGS. 1a to 1c, and intended to be obtained according to a second preferred embodiment of the manufacturing method according to the invention.

Reflector 6 firstly includes a mirror 16, of a non-planar shape, made of glass and of the order of 4 mm thick. In this case its shape is single-curvature, and it is only very slightly curved. However, other shapes may be envisaged, without going beyond the scope of the invention.

It also includes a support structure 18, for example made from a cylinder 136 from which essentially triangular ribs 138 protrude. The ends of these ribs 138, which are spaced along cylinder 136 and orthogonal to it, are connected by two appreciably flat struts 140. This structure 18 may be made of steel, with large manufacturing tolerances. It has means enabling the reflector to be rotated around shaft 10, in this case rotation pins 19 constituted by the two cylinder ends 136.

The mechanical connection between support structure 18 and mirror 16 is not made over the entire inner surface of the latter, but with the assistance of multiple metal links 120 interposed between the mirror and structural elements 138, 140, and securely attached to both. The secure attachment in this case is preferentially accomplished by bonding, although other conventional means may be used, without going beyond the scope of the invention.

As will be described in greater detail below, elements 120 are profiles with an essentially T-shaped section, the base of each of which is doubled so as to reveal between the two bases a space penetrated by a sliding portion structural elements 138, 140.

In the position of FIG. 5a, the lower ends of profiles 120, which form the head of the T, are bonded to the inner face of the mirror, called the non-reflective face, whereas the double base of the T which fits tightly round the sliding portion of its corresponding structural element 138, 140 is also bonded to this sliding portion.

Profiles 120 are made, for example, of an aluminium-based alloy, whereas the adhesive used may be of the single-component polyurethane paste-like adhesive type, for example adhesive sold by the company 3M with the reference "Polyurethane Adhesive Sealant 560". Alternatively, to bond the end of profiles 120 to the mirror a double-sided adhesive tape may be used. The adhesive used advantageously has a certain flexibility, unlike the more rigid links, which enables the mechanical stresses to which the mirror is subjected to be reduced, and/or the impacts occasioned by adverse weather to be absorbed.

Due to the rigidity conferred by metal profiles 120, the mirror, the shape of which is maintained due to the latter, has very satisfactory optical properties.

To manufacture it, as represented schematically with reference to FIGS. 6a to 6d, mirror 16 is firstly shaped in a mould 30, and then securely attached to the latter temporarily, for example using a conventional adhesive. This step is represented schematically in FIG. 6a. It is therefore mould 30 which temporarily gives mirror 16 its definitive shape.

Profiles 120 are then installed on structural elements 138, 140. As mentioned above, FIG. 6b shows that each profile 120 has an essentially T-shaped section, the base of each one being doubled so as to reveal a space 144 between two parallel bases 142a, 142b.

To accomplish the installation, each profile 120 clamps a sliding portion of its corresponding structural element 138, 140, and this sliding portion indeed penetrates into space 144, between two parallel bases 142a, 142b, along the entire length of profile 120.

Figure 6C:
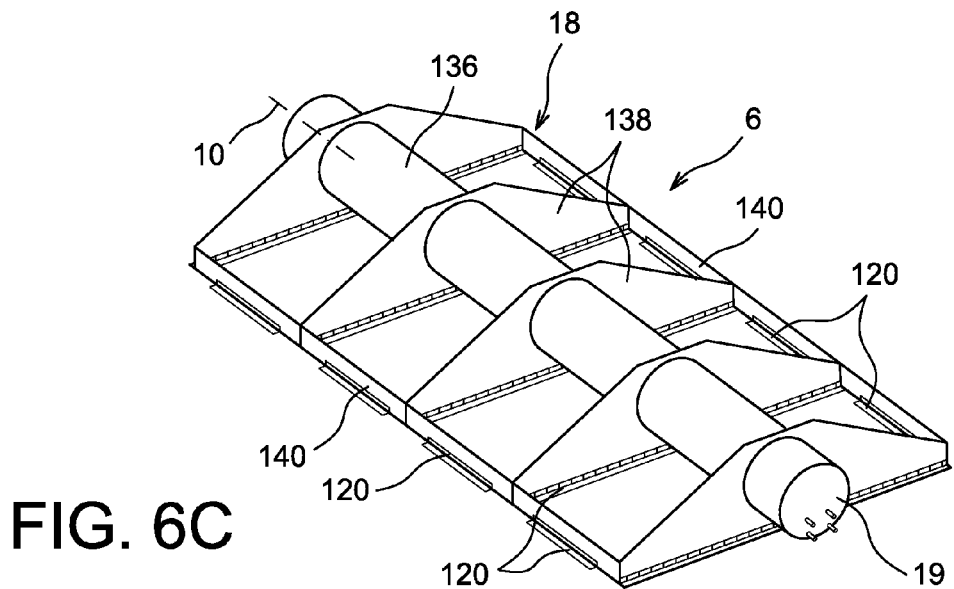

After all of profiles 120 have been installed on structure 18, by clamping, the assembly shown in FIG. 6c is obtained.

A step of positioning of mirror 16 relative to rear structure 18 is then accomplished, by moving the assembly consisting of mould 30 holding the mirror relative to structure 18. In tangible terms, the support structure is placed such that it is stationary in a known frame of reference, in which the mould/mirror assembly is moved vertically upwards towards this structure, as has been represented schematically by arrow 32 in FIG. 6d. At the end of this step of positioning of mirror 16 the latter is positioned opposite and apart from structure 18, and these two elements are then in their final relative positions.

Figure 6D:
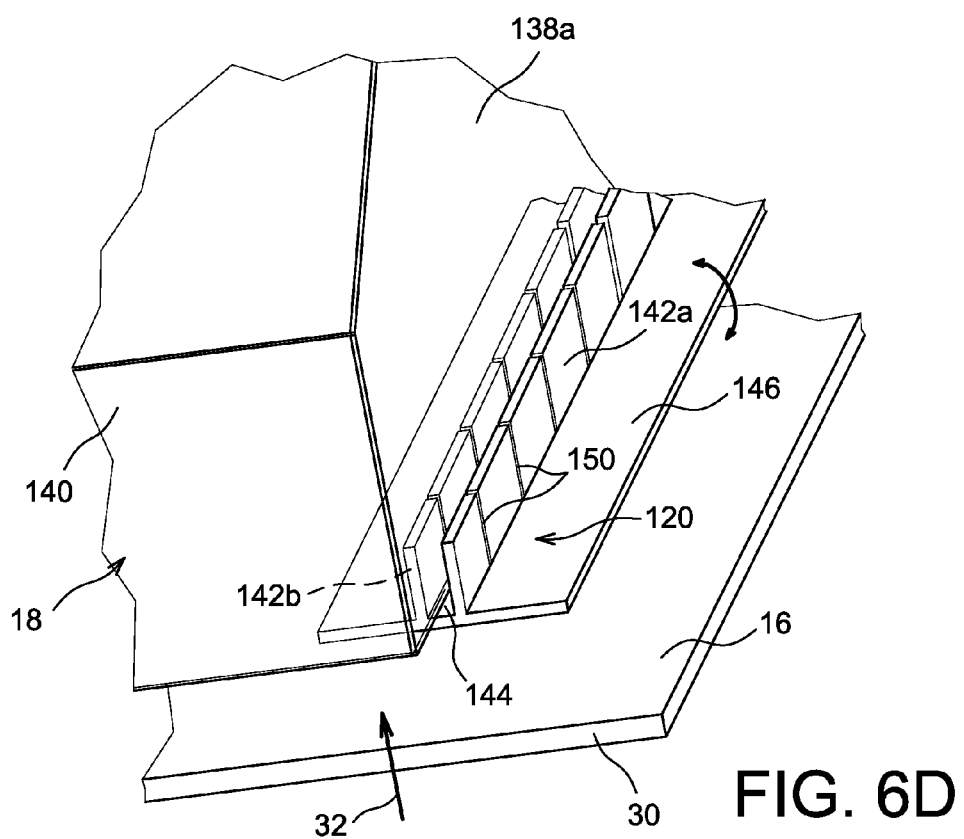

One of the characteristics of this second preferred embodiment lies in the fact that a step of adjustment of profiles 120 is accomplished at least partly automatically during the previously described step of positioning of the mirror, represented in FIG. 6d.

Indeed, during the relative movement between mirror 16 and structure 18, head 146 of profiles 120 presses against the inner surface of the mirror, and the continuation of this movement leads to a sliding of sliding portions 138a of structural elements 138, 140, in space 144 of their respective profiles.

In this case it is thus the action of pressing against the mirror and the continuation of the relative movement between the latter and the rear structure which lead profiles 120 to be slid relative to this rear structure. The automatic character of the movement is naturally advantageous, in that it simplifies the implementation of the method.

Naturally, the sliding action is not the same for each profile 120, nor necessarily identical at each point of the profile.

Moreover, as is more visible in FIG. 6d, parallel bases 142a, 142b may be given grooves 150 spaced lengthways relative to one another, in order to give the profiles flexibility in this same lengthways direction, during their adjustment step. This flexibility of the profile also prevents a negative of flat heads 146 of the profiles from being printed on the mirror, which could impair the mirror's properties.

In addition, grooves 150 allow the adhesive added in addition to be removed, and also allow the adhesive used in connection with the method to dry.

The extent of the sliding action is therefore dependent on the distance between the mirror and the edges of elements 138, 140 facing this mirror. It should also be noted that these edges may be produced with large tolerances, without this being detrimental to the maintenance of the mirror's shape, since the mirror is supported directly by head 146 of profiles 120, and not by these edges housed in inter-bases spaces 140 of the profiles.

The abovementioned sliding may be continued after the step of positioning of the mirror, for example in order to improve the pressing of heads 146 against the mirror and/or, if applicable, to remove the surplus adhesive from profiles 120 to which adhesive has previously been applied. This may be accomplished manually or in an automated fashion.

After this operational step, the step of adjustment of profiles 120 is completed, and the latter then occupy their position of secure attachment corresponding to their definitive position relative to the mirror and to the support structure, these profiles then still being held, by clamping, on structural elements 138, 140. Profiles 120 are then bonded to the mirror and support structure 18. If the profiles have previously had adhesive applied before they are assembled on structural elements 138, 140, a simple drying time need merely be allowed before this adhesive hardens.

Figure 7A:
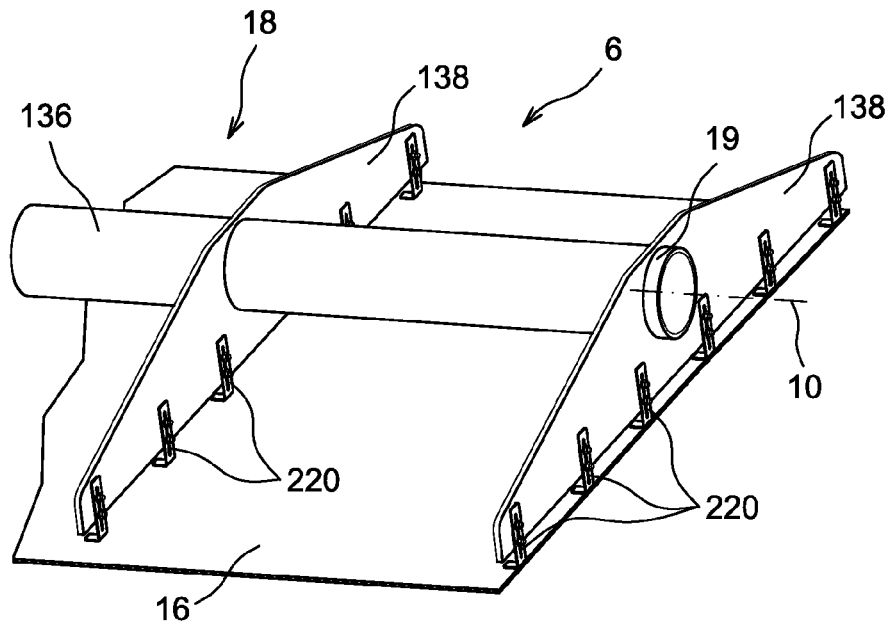
FIGS. 7a and 7b are perspective and front views of a reflector intended to be obtained according to a third preferred embodiment of the manufacturing method according to the invention.
Figure 7B:
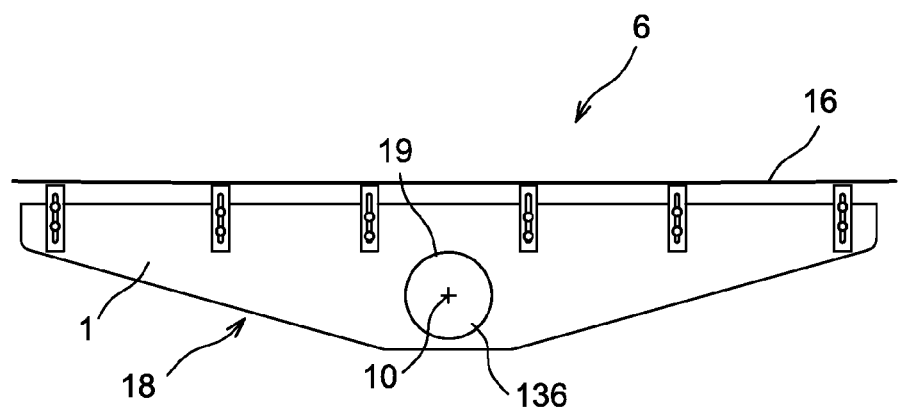

With reference, at present, to FIGS. 7a and 7b, another reflector 6 may be seen of the same type as those used in system 1 of FIGS. 1a to 1c, and intended to be obtained according to a third preferred embodiment of the manufacturing method according to the invention.

Reflector 6 firstly includes a mirror 16, of a non-planar shape, made of glass and of the order of 4 mm thick. In this case its shape is single-curvature, and it is only very slightly curved. However, other shapes may be envisaged, without going beyond the scope of the invention.

It also includes a support structure 18, for example made from a cylinder 136 from which essentially triangular ribs 138 protrude. These ribs 138 are spaced along cylinder 136 and orthogonal to the latter. This structure 18 may be made of steel, with large manufacturing tolerances. It has means enabling the reflector to be rotated around shaft 10, in this case rotation pins 19 constituted by the two cylinder ends 136.

The mechanical connection between support structure 18 and mirror 16 is not made over the entire inner surface of the latter, but with the assistance of several metal links 220 interposed between the mirror and ribs 138, and securely attached to the latter. In this case, the secure attachment is preferentially accomplished by bonding in the mirror and by screwing in support structure 18, although other conventional means may be used without going beyond the scope of the invention.

As will be described in greater detail below, metal links 220 are tabs having a supporting head on the mirror, and also a body connected to the support structure by a slide connection formed by a groove traversed by at least two screws.

In the position of FIG. 7a, the lower end of tabs 220, corresponding to the supporting head, is bonded to the inner face of the mirror, whereas the body of the tabs is securely attached by screwing to ribs 138.

Tabs 220 are made, for example, of an aluminium-based alloy, whereas the adhesive used may be of the single-component polyurethane paste-like adhesive type, for example adhesive sold by the company 3M with the reference "Polyurethane Adhesive Sealant 560". Alternatively, to bond the end of profiles 120 to the mirror a double-sided adhesive tape may be used. For their part, the screws are preferentially made of steel.

Due to the rigidity conferred by metal tabs 220, the mirror, the shape of which is maintained due to the latter, has very satisfactory optical properties.

Figure 8A:
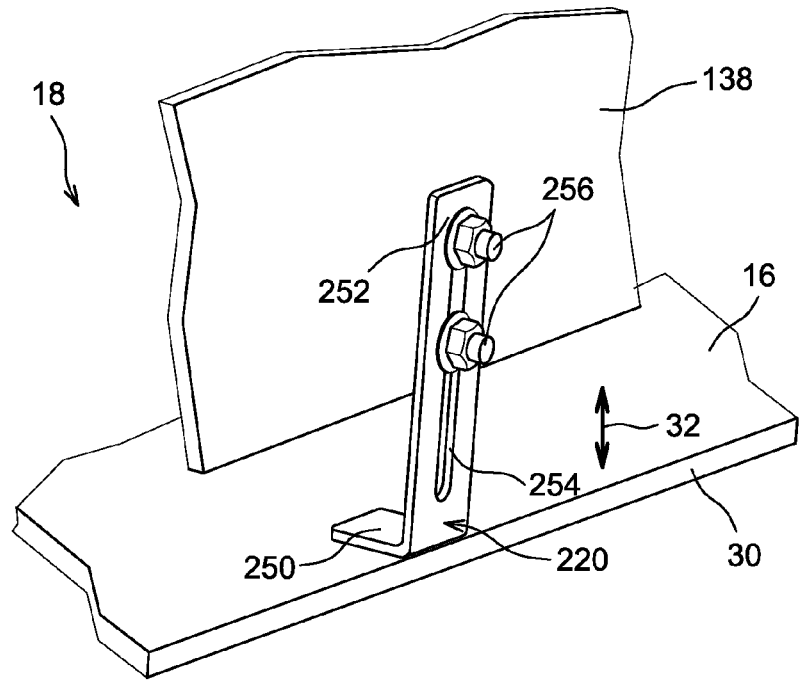
FIGS. 8a and 8b represent perspective views representing schematically different steps of the manufacturing method according to the third preferred embodiment.
Figure 8B:
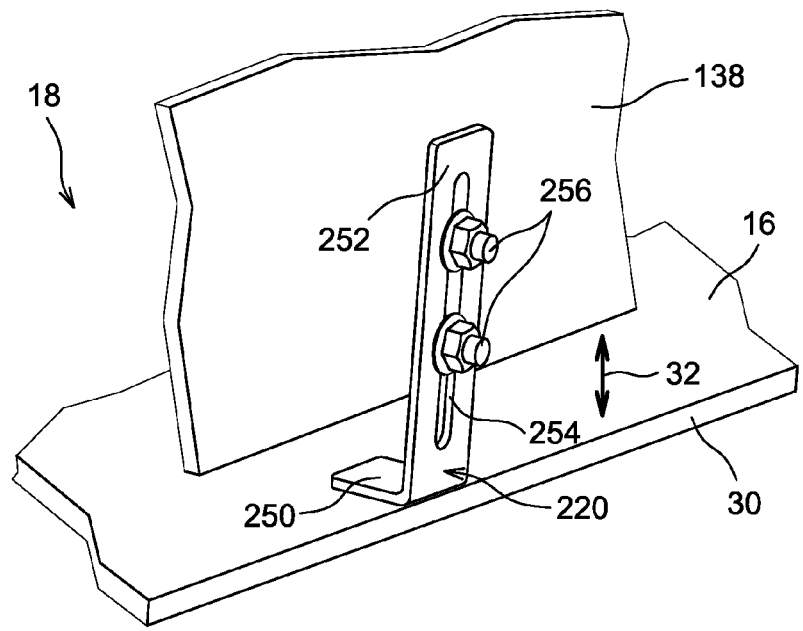

To manufacture it, as represented schematically with reference to FIGS. 8a and 8b, mirror 16 is firstly shaped in a mould 30, and then securely attached to the latter temporarily, for example using a conventional adhesive. It is therefore mould 30 which temporarily gives mirror 16 its definitive shape.

Tabs 220 are then installed on ribs 138. As mentioned above, FIG. 8a shows that each tab 220 has a supporting head 250 intended to be applied against the mirror, together with a vertical body 252 supporting this head.

The body has a vertical straight groove 254 traversed by two screws 256 belonging to bolts, these screws being housed in clearance holes (not represented) of ribs 138.

To construct the assembly, screws 256 are put in place through the clearance holes and through grooves 254, and the associated nuts are then screwed on to the ends of these screws.

After all of tabs 220 are installed they are held in place by pressing the highest screw against the upper end of groove 254, as shown in FIG. 8a. The nuts may be tightened so as to apply a friction force between tabs 252 and ribs 138, without however preventing relative movement between the two in an upward direction, which is required for the final step, which will now be described.

Indeed, a step of positioning of mirror 16 relative to rear structure 18 is then accomplished, by moving the assembly consisting of mould 30 holding the mirror relative to structure 18. In tangible terms, the support structure is placed such that it is stationary in a known frame of reference, in which the mould/mirror assembly is moved vertically upwards towards this structure, as has been represented schematically by arrow 32 in FIG. 8b. At the end of this step of positioning of mirror 16 the latter is positioned opposite and apart from structure 18, and these two elements are then in their final relative positions.

One of the characteristics of this third preferred embodiment lies in the fact that a step of adjustment of tabs 220 is accomplished at least partly automatically during the previously described step of positioning of the mirror, represented in FIG. 8b.

Indeed, during the relative movement between mirror 16 and structure 18, supporting head 250 of tabs 220 presses against the inner surface of the mirror, and the continuation of this movement leads to a movement of tabs 220 relative to ribs 136, allowed due to the sliding of screws 256 in grooves 254. The diameter of the screws is designed to be roughly identical to the width of the groove, so as to impose a single degree of freedom on each tab 220, equal to that of the abovementioned sliding. The mechanical connection produced thus constitutes a slide.

It is therefore the action of pressing against the mirror and the continuation of the relative movement between the latter and the rear structure which lead tabs 220 to be slid relative to this rear structure. The automatic character of the movement is naturally advantageous, in that it simplifies the implementation of the method.

Naturally, the sliding is not the same for each tab 220. The extent of the sliding action is dependent on the distance between the mirror and the edges of ribs 138 facing this mirror. These ribs may therefore be produced with large tolerances, without this being detrimental to the maintenance of the mirror's shape, since the latter is supported directly by head 250 of tabs 220, and not by ribs 138.

The abovementioned sliding may be continued after the step of positioning of the mirror, for example in order to improve the pressing of heads 250 against the mirror and/or, if applicable, to remove the surplus adhesive from tabs 220 which have previously had adhesive applied. This may be accomplished manually or in automated fashion.

After this operational step, the step of adjustment of tabs 220 is completed, and the latter then occupy their position of secure attachment corresponding to their definitive position relative to the mirror and to the support structure, these tabs still being held by the bolts. These tabs 220 are then bonded on to the mirror. If they have previously had adhesive applied before they are assembled on ribs 138, a simple drying time need merely be allowed before this adhesive hardens.

In rear structure 18 the bolts are tightened so as to prevent any relative movement between ribs 138 and tabs 220. In this case the secure attachment is therefore accomplished by screwing. By this means, if the mirror must be replaced, it becomes easy to re-use structure 18 and its tabs 220, by untightening and then retightening the bolts.

Various modifications may naturally be made by those skilled in the art to the invention just described, solely as non-restrictive examples.

The invention claimed is:

1. A method of manufacturing a reflector (6) including a mirror (16) supported by a support structure (18), where the said method includes a step of positioning the mirror relative to the said support structure by moving a mould (30) supporting the mirror relative to the said support structure, characterised in that it also includes a step of adjustment of multiple links (20, 120, 220) between the mirror and the support structure, in a position of secure attachment in which they are intended to be securely attached to the mirror and to the support structure, where this step of adjustment, accomplished during the said step of positioning of the mirror and/or after this step, leads to a movement of at least a proportion of the links relative to the said support structure, and in that the said links (20, 120, 220) are intended to be bonded to the mirror (16), wherein said links comprise profiles (120) with an essentially T-shaped section, the base of each of which is doubled so as to reveal between the two bases (142a, 142b) a space (144) penetrated by a sliding portion (138a) of the support structure (18), which slides into this space (144) during the said step of positioning of the mirror (16).

2. A manufacturing method according to claim 1, in which the said step of adjustment, leading to the movement of at least a proportion of the links (120, 220) relative to the said support structure (18), is accomplished at least partially automatically during the said step of positioning of the mirror (16), after the links concerned press against the said mirror.

3. A manufacturing method according to claim 1, in which the said step of adjustment, leading to the movement of at least a proportion of the links (20) relative to the said support structure (18), is accomplished exclusively after the said step of positioning of the mirror (16).

4. A manufacturing method according to claim 1, in which the said links (20, 120, 220) are intended to be securely attached to the support structure (18) by bonding and/or screwing and/or welding and/or riveting.

5. A manufacturing method according to claim 1, in which the said links (20, 120, 220) are intended to be securely attached by bonding to the mirror (16) and/or to the support structure (18), where adhesive is applied to the said links before implementation of the step of adjustment.

6. A manufacturing method according to claim 1, in which the said links are lengthened elements (20) housed such that they can slide in corresponding apertures (22) of the support structure (18), where the said lengthened elements are inserted into the apertures (22) before being pressed against the mirror.

7. A manufacturing method according to claim 6 in which, at the end of the step of adjustment, the said lengthened links (20) are held by gravity pressing against the mirror (16), in their position of secure attachment.

8. A manufacturing method according to claim 1, in which each profile (120) is installed on the support structure (18) before implementing the said step of positioning of the mirror, by clamping the said sliding portion (138a) of the corresponding support structure (18), between the two bases of the profile (142a, 142b).

9. A manufacturing method according to claim 1, in which the said links are tabs (220) with a supporting head (250) on the mirror (16), and a body (252) connected to the support structure (18) by a slide connection formed by a groove (254) traversed by at least two screws (256) and in which, during the said step of adjustment, at least a proportion of the links (220) move automatically relative to the said support structure (18) by moving the screws (256) in the groove (254), after pressing the supporting heads (250) against the said mirror (16).

10. A manufacturing method according to claim 9 in which, after the said step of adjustment of the links (220), the latter, positioned in their position of secure attachment, are securely attached to the support structure by screwing the said screws (256).

11. A manufacturing method according to claim 1, in which the said mirror (16) is not planar, and in which the said mirror (16) is made of glass.

12. A manufacturing method according to claim 1, in which the said links (20, 120, 220) are made of metal, ceramic or a polymer material.

13. A field (4) of reflectors (6) each of which is manufactured according to a method defined in claim 1.

14. A field of reflectors according to claim 13, characterised in that it is of the Fresnel type, with the reflectors (6) positioned side-by-side, and each support structure (18) installed pivoting on a frame (8).

15. A system (1) including a solar collector (2) together with a field (4) of reflectors (6) concentrating the solar radiation on the collector, according to claim 13 or claim 14.

* * * * *